March 13, 1962 D. C. BAKER 3,024,777
ENGINE PREHEATER
Filed Sept. 11, 1958 2 Sheets-Sheet 1

INVENTOR.
DAVID C. BAKER
BY
Bauer and Seymour
ATTORNEYS

March 13, 1962     D. C. BAKER     3,024,777
ENGINE PREHEATER
Filed Sept. 11, 1958     2 Sheets-Sheet 2
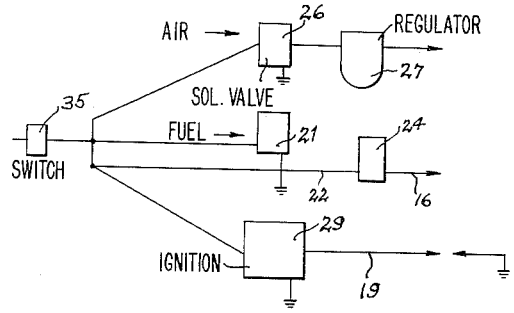
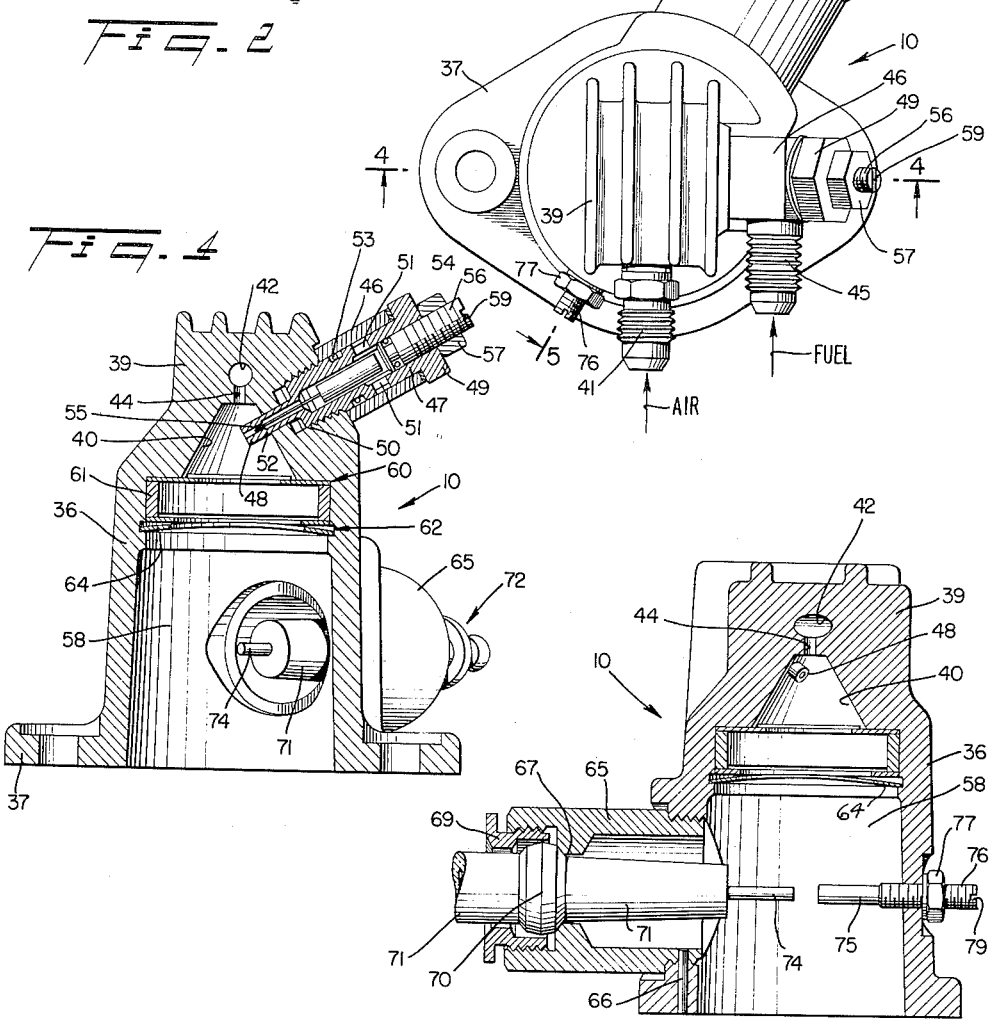
INVENTOR.
DAVID C. BAKER
BY
Bauer and Seymour
ATTORNEYS

United States Patent Office 3,024,777
Patented Mar. 13, 1962

3,024,777
ENGINE PREHEATER
David C. Baker, Sidney, N.Y., assignor to The Bendix Corporation, a corporation of Delaware
Filed Sept. 11, 1958, Ser. No. 760,386
4 Claims. (Cl. 123—122)

This invention relates to a preheater system for internal combustion engines. Such system is particularly useful with diesel engines used in cold climates.

In the Arctic and Antarctic regions temperatures of −30° F. to −60° F. or below are not uncommon. Diesel engines employed under such conditions are difficult to start because they depend upon the heat generated by compression of air alone to ignite the charge in the cylinder. When the intake air is too cold, compression of such air is insufficient to ignite the air-fuel mixture. Consequently, the intake air must be preheated before it is introduced to the cylinders of the engine during the periods when the cold engine is being started.

The invention has among its objects the provision of a novel, simple and reliable preheater system for internal combustion engines.

A further object of the invention resides in the provision of a preheater system which is particularly useful with diesel engines, and may be employed to advantage with multi-fuel diesel engines.

Yet another object of the invention lies in the provision of an engine preheater system which makes use of the sources of the electrical power and fuel for the engine.

A further object lies in the provision of an improved, simplified and efficient combustion heater unit for the preheater system of the invention.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a fragmentary somewhat schematic view of an engine preheater system made in accordance with the invention, a fragmentarily shown air intake manifold of the engine being shown partially in section;

FIG. 2 is a somewhat schematic wiring diagram of the control circuit for the preheater system shown in FIG. 1;

FIG. 3 is a view in plan of the combustion unit of the preheater system;

FIG. 4 is a view in vertical section through such combustion unit, the section being taken along line 4—4 of FIG. 3; and FIG. 5 is a fragmentary view in vertical section through the combustion unit, the section being taken along the line 5—5 of FIG. 3.

Figure 1:
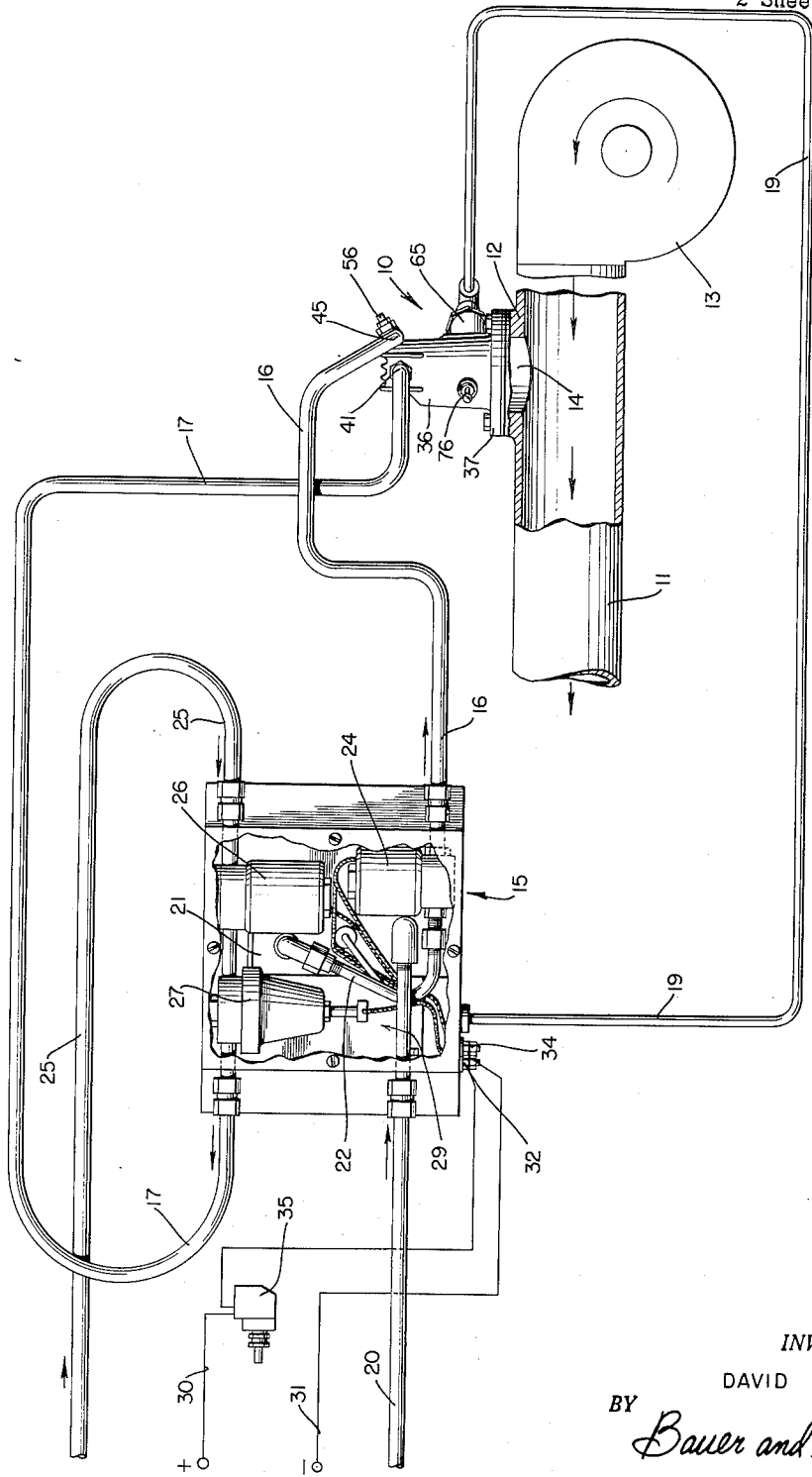

The illustrative embodiment of preheater system includes a combustion unit 10 shown somewhat generally in FIG. 1 and in detail in FIGS. 3, 4, and 5. Unit 10, which will be described in detail hereinafter, provides for combustion of fuel derived from the fuel source for the engine, the products of such combustion being discharged into the intake manifold 11 of the engine at a position between an intake air turbo-compressor 13, shown schematically in FIG. 1 and the engine (not shown). Such products of combustion, mixing from the cold air from the turbo-compressor, raises the temperature of the resulting mixture sufficiently for such gaseous mixture, when mixed with fuel injected in the injected cylinders to be ignited by engine compression.

After the engine has started, operation of unit 10 may be discontinued. The periods of operation of unit 10 are under the control of the operator, combustion in unit 10 being initiated by closing a switch 35 and being stopped by opening such switch. The construction of control unit 15 governing the operation of combustion unit 10, and the manner of operation of unit 15, will be described hereinafter.

Combustion unit 10 is secured to manifold 11 so that the interior of the combustion unit communicates with an opening 14 in the manifold. Unit 10 has a flange 37 on the bottom thereof which is secured by studs to a hollow boss on the manifold surrounding opening 14, the unit being sealed to the boss by an interposed gasket, as shown.

Combustion unit 10 is under the control of unit 15, the fuel for unit 10, the combustion air therefor, and the ignition system for the unit all being controlled by mechanisms within unit 15. A fuel supply 16 leads from unit 15 to combustion unit 10. A pipe 17 carries compressed air from unit 15 to the combustion unit, and an electrical conduit 19 extends from unit 15 to a spark discharge means in the combustion unit. Fuel for the combustion unit enters control unit 15 through pipe 20. Such fuel is normally that supplied to the engine, and in the case of a diesel engine may be kerosene, diesel fuel, gasoline, or that known as JP4. The preheater system shown, including combustion unit 10 and control unit 15, may be used without adjustment with any of such fuels, and so such preheater system is particularly advantageous for use with multi-fuel diesel engines.

As indicated in FIG. 1, fuel supply pipe 20 is connected to the inlet of a fuel pump 21 within control unit 15. Such fuel pump may be of any suitable design, but that shown is of the reciprocating, solenoid-operated type. The outlet end of pump 21 is connected by a pipe 22 to fuel discharge pipe 16 leading to the combustion unit. Interposed between pipes 22 and pipes 16 is a solenoid-operated fuel valve 24. Compressed air from the suitable source enters unit 15 through pipe 25, which is connected to a solenoid-operated air valve 26 and an air pressure regulator 27 connected in series and located within unit 15. The outlet port of regulator 27 is connected to the previously described compressed air pipe 17 leading to combustion unit 10.

Also located within unit 15 is an ignition unit 29. The ignition unit 29, the pump 21 and valves 24 and 26 are powered by a suitable source through wires 30 and 31. The terminals on unit 15 to which such wires are connected are designated 32 and 34, respectively. The previously described manually operated switch 35 is interposed in wire 30 and is connected as shown in FIG. 2 so that when the switch is closed the ignition unit is operated, valves 24 and 26 are opened and fuel pump 21 is started. When switch 35 is opened, the ignition unit 29 is deenergized, the fuel pump 21 is stopped, and the solenoid operated fuel and air valves 24 and 26, respectively, are closed.

The structure of combustion unit 10 is shown more fully in FIGS. 3 to 5, inclusive. As there shown the unit has a main cup-like casing 36 which may conveniently be formed as a casting. In its preferred operation position the combustion unit is mounted as shown in FIGS. 1 and 4 so that flange 37 lies at the bottom. Casing 36 has a thickened head portion 39 which is somewhat smaller in horizontal section than the main portion of the casing, such head portion having a downwardly diverging frusto-conical mixing chamber 40 therein. Above the upper end of chamber 40 and at one side thereof, head portion 39 is provided with an air inlet fitting 41 to which compressed air pipe 17 is connected. A horizontal bore 42 in head portion 39 communicates with inlet fitting 41.

A vertical passage 44 leads compressed air from passage 41 downwardly centrally into chamber 40.

The combustion fuel for unit 10 is supplied through a fitting 45. Connected to the end of fuel pipe 16 inlet fitting 45 has a hollow connector portion 46 through which a hollow connector-retaining stud 47 extends. The outer end of such stud is headed at 49 and overlies the outer end of connector 46, the inner end of the stud being threaded and being screwed into a downwardly inclined threaded well 50 on one side of the head portion 39 of housing 36. Stud 47 has a radial passage 51 communicating with inlet fitting 45, so that fuel from pipe 16 is led into the interior of stud 47.

The inner end 52 of stud 47 is in the form of an elongated relatively small circular cylindrical nozzle 48 coaxial with the stud 47. Such nozzle 48 extends through a smaller hole at the bottom of well 50 in head portion 39, the inner end of the nozzle 48 lying generally aligned with and vertically beneath air conducting passage 44. Thus fuel introduced into chamber 40 through the nozzle 48 of stud 47 is immediately entrained in the compressed air issuing from passage 44, so that the fuel is thoroughly broken up and mixed with such air.

To provide for adjustment of the rate of combustion fuel discharge into chamber 40 a needle valve element 54 is employed. Element 54 is in the form of a stud having an inner body portion 53, confronting passage 51, of somewhat less diameter than the longitudinal passage through stud 47. Below such body portion 53, valve element 54 is provided with an axially extending needle member 55 which loosely fits within the central opening through the nozzle 48. Member 54 is held in longitudinal adjusted position by means of mating threads on the outer end 56 of member 54 and the outer end of the central passage in stud 47. A slot 59 on the outer end of member 54 allows the latter readily to be turned to adjust the rate of fuel inlet to the combustion unit, or to be partially or completely removed as for cleaning the fuel discharge orifice in nozzle 48. A check nut 57 mounted on the outer end 56 of member 54 secures such member in adjusted position.

To insure thorough dispersion of the fuel in the incoming combustion air, and to prevent the striking back of the flame in the combustion chamber 58 into the mixing chamber 40, a screen assembly is provided between such two chambers. Such screen assembly includes an upper screen 60 of fine mesh wire disposed horizontally at the bottom of chamber 40, a spacer ring or sleeve 61, a lower coarser screen 62 disposed at the top of the combustion chamber 58. A retaining ring 64 located in an annular seat in the wall of housing 36 retains screens 60 and 62 and the spacer sleeve 61 in the positions shown.

Extending laterally from housing 36 generally intermediate the vertical length of the combustion chamber 58 is a sub-housing 65 which has the inner end thereof screwed into an opening in the side wall of housing 36. Sub-housing 65 is retained in position by a pin 66 extending upwardly through the bottom of housing 36 into sub-housing 65 as shown in FIG. 5. Sub-housing 65 is provided with an inwardly extending flange 67 and with an internally threaded nut 69 positioned in the threaded outer end of the passage in the sub-housing to provide a spark plug retaining seat. The spark plug 72 has an insulating sleeve 71 with an annular enlargement 70 which is sealingly received in the seat between members 67 and 69. Spark plug 72 has a central electrode 74 which extends into the combustion chamber to a position somewhat short of the vertical center of such chamber. Cooperating with electrode 74 is a second, ground electrode which is mounted on the opposite wall of housing 36 coaxial with electrode 74. Electrode 75 has a threaded stem 76 received within a threaded hole in casing 36. The latter electrode may readily be adjusted toward or away from electrode 74, to adjust the length of the spark gap, by engaging a slot 79 in stem 76 of electrode 75 with a suitable tool such as a screw driver. Electrode 75 is held in adjusted position by a lock nut 77.

An engine provided with the above described preheater system is started as follows: The engine is turned over by means of the engine starter. While the engine is turning over, the switch 35 is closed to cause spark discharges to take place between electrodes 74 and 75 of combination unit 10. Simultaneously therewith, combustion air and fuel are admitted to mixing chamber 40 through passage 44 and nozzle 48. The air and fuel are mixed and dispersed in chamber 40, and pass downwardly through the screen assembly which causes their further mixing. The frustoconical shape of mixing chamber 40 aids in the dispersion of the fuel, since it allows the expansion of the air and thus permits the air and fuel to mix more readily. Upon reaching the spark gap between the electrodes, the thus formed combustible mixture is ignited. The products of combustion from chamber 58 enter manifold 11 through opening 14, mixing with the air from the turbo-compressor 13, and thus raising the temperature of the air drawn into the engine. The volume of such products of combustion relative to the air provided by the turbo-compressor is insufficient to prevent operation of the engine in a normal manner. After engine ignition has taken place, switch 35 is opened, thereby deenergizing the control mechanisms in unit 15 and stopping the operation of preheater unit 10.

Although only a limted number of embodiments of the invention have been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. An engine preheater unit comprising a chamber-forming housing having an open forward delivery end and a closed rear end, the housing being generally cup-shaped, an air inlet passage leading into the closed rear end of the housing generally centrally thereof, fuel inlet means extending through the wall of the housing with its inner end generally aligned with the air inlet passage and lying forwardly of such passage, and a spark discharge means having electrodes forming a gap lying generally centrally of the housing and forwardly of the fuel inlet means, the rear end of the chamber in which the fuel inlet means is located and into which the air inlet passage discharges having a generally frusto-conical fuel and air mixing sub-chamber which increases in area in the forward direction, the said mixing sub-chamber expanding abruptly into a combustion sub-chamber forwardly of the large end of the mixing sub-chamber.

2. An engine preheater unit as claimed in claim 1, comprising a screen disposed transversely of the chamber and between the rear end thereof and the spark discharge device.

3. An engine preheater unit as claimed in claim 2, comprising a transverse annular shoulder at the forward end of the mixing sub-chamber, said screen lying across and against the shoulder.

4. An engine preheater unit as claimed in claim 3, comprising a second screen, of larger mesh than the first recited screen lying across the chamber forwardly of the first screen, and means to retain the screens in the housing in spaced parallel relationship.

References Cited in the file of this patent

UNITED STATES PATENTS

| | | |
|---|---|---|
| 1,379,178 | Good | May 24, 1921 |
| 1,395,399 | Doble | Nov. 1, 1921 |
| 1,473,136 | Woolson | Nov. 6, 1923 |
| 1,733,792 | Good | Oct. 29, 1929 |
| 2,225,647 | Liekendael | Dec. 24, 1940 |
| 2,749,894 | Sariti | June 12, 1956 |